(12) United States Patent
Smith et al.

(10) Patent No.: US 9,679,140 B2
(45) Date of Patent: Jun. 13, 2017

(54) OUTBREAK PATHOLOGY INFERENCE

(71) Applicant: McAfee, Inc., Santa Clara, CA (US)

(72) Inventors: Ned M. Smith, Beaverton, OR (US);
Esteban Gutierrez, Portland, OR (US);
Andrew Woodruff, Portland, OR (US);
Aditya Kapoor, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 16 days.

(21) Appl. No.: 14/583,632

(22) Filed: Dec. 27, 2014

(65) Prior Publication Data

US 2016/0188880 A1    Jun. 30, 2016

(51) Int. Cl.
| | |
|---|---|
| *G06F 21/00* | (2013.01) |
| *G06F 21/56* | (2013.01) |
| *H04L 29/06* | (2006.01) |
| *G06F 21/57* | (2013.01) |

(52) U.S. Cl.
CPC .......... *G06F 21/567* (2013.01); *G06F 21/577* (2013.01); *H04L 63/145* (2013.01); *G06F 2221/034* (2013.01)

(58) Field of Classification Search
CPC combination set(s) only.
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 9,038,177 B1* | 5/2015 | Tierney | H04L 63/1408 709/224 |
| 2006/0265489 A1 | 11/2006 | Moore | |
| 2007/0038677 A1 | 2/2007 | Reasor et al. | |
| 2010/0242094 A1* | 9/2010 | Hussain | G06F 21/564 726/4 |
| 2011/0055132 A1 | 3/2011 | Mahdian et al. | |

(Continued)

FOREIGN PATENT DOCUMENTS

WO    2016105940    6/2016

OTHER PUBLICATIONS

International Search Report and Written Opinion in International Application No. PCT/US2015/064588 mailed on Apr. 11, 2016; 8 pages.

*Primary Examiner* — Ghazal Shehni
(74) *Attorney, Agent, or Firm* — Patent Capital Group (57) ABSTRACT

In an example, a system and method for outbreak pathology inference are described. In certain computational ecosystems, malware programs and other malicious objects may infect a machine, and then attempt to infect additional machines that are "networked" to the first machine. In some cases, the network may be a physical or logical network, such as an enterprise network. However, "social networking" may also connect one machine to another, because users may share files or data with one another over social networks. In that case, client devices may be equipped with a telemetry engine to gather and report data about the machine, while a system management server receives reported telemetry. The system management server may use both logical networks and social networks to infer potential outbreak paths and behaviors of malware.

25 Claims, 6 Drawing Sheets

(56) References Cited

U.S. PATENT DOCUMENTS

2012/0144492 A1\* 6/2012 Griffin ................ H04L 63/1408
  726/25
2013/0160126 A1 6/2013 Kapoor et al.
2014/0283067 A1 9/2014 Call et al.

\* cited by examiner

OUTBREAK PATHOLOGY INFERENCE

FIELD OF THE DISCLOSURE

This application relates to the field of computer security, and more particularly to a system and method for outbreak pathology inference.

BACKGROUND

Computer security is an ever-evolving arms race between users and security experts on the one hand, and malicious actors such as malware authors on the other hand. As malware attacks become increasingly sophisticated, the security community has evolved away from a purely reactive security posture to proactively identifying threats and remedying the threats before a full-blown outbreak occurs.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

In an example, a system and method for outbreak pathology inference are described. In certain computational ecosystems, malware programs and other malicious objects may infect a machine, and then attempt to infect additional machines that are networked to the first machine. In some cases, the network may be a physical or logical network, such as an enterprise network. However, "social networking" may also connect one machine to another, because users may share files or data with one another over social networks. In that case, client devices may be equipped with a telemetry engine to gather and report data about the machine, while a system management server receives reported telemetry. The system management server may use both logical networks and social networks to infer potential outbreak paths and behaviors of malware.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment.

Malware comes in many different flavors. Some is clever and highly sophisticated. deftly exploiting obscure flaws in popular software to deliver devastating payloads. Other malware is the result of bored teenagers downloading virus authoring kits off of dubious Internet sites and performing some minimal customization. However, regardless of the sophistication level, a successful malware outbreak can be economically or socially devastating to an enterprise. Even in the "bored teenager" scenario, networks may be brought to a crawl, and productivity adversely affected. In many more sophisticated attacks, many millions of dollars' worth of data can be compromised and delivered to the attackers. After-the-fact cleanup can, in the worst cases, run into the millions of dollars.

Thus, it is beneficial to proactively detect threats and to predict a propagation path in advance. Threat propagation analysis may include predicting a potential path for invalid malicious object throughout a network, and across a plurality of networks.

In a general sense, malware objects propagate between users who are connected to one another. For example, within an enterprise, a user operating a machine connected to the enterprise network may become infected with a malware object. That malware object may then propagate through the network, and try to infect other vulnerable machine. In some cases, this propagation may occur via vulnerable enterprise services, such as file servers, Web servers, shared workspaces, and other shared network resources.

To help predict and mitigate such outbreaks, enterprise class computing devices may be equipped with a telemetry client. The telemetry client may include a system agent, which in some examples executes on a trusted co-processor, in a privileged memory space, or within a trusted execution environment (TEE). The telemetry client may collect information about the status, health, operating environment, and network connections of the client device, and report its telemetry data to an enterprise security controller.

In some cases, the enterprise security controller may elect to share selected data with a security services provider. The security services provider and enterprise security controller together can act to anticipate and mitigate attacks on the enterprise network. The telemetry client may collect telemetry data from the client machine. In this context, telemetry data may include device health and status information, memory state, running programs and processes, register usage, IP connectivity, network connections, connected resources, hard disk usage information, and installed programs, by way of non-limiting example. More broadly, telemetry data may include any data that may be collected from the client device by privileged software running on the client device.

The enterprise security controller may analyze these data and identify potential vulnerabilities or the presence of potential malicious objects. Advantageously, an enterprise security controller that is configured to receive telemetry data from a plurality of client devices may receive a broader cross-section of telemetry then an individual machine would receive. This enables the enterprise security controller to identify trends and threats that may not be practically visible to an individual computing device.

In one example, the enterprise security controller constructs a telemetry graph, which maps interconnections between client devices on the enterprise network, as well as potential entry points for malware. These connections may include direct network connections, and may also include connections that represent resources shared between different computing machines. The more connections that two computing devices share, the greater the possibility that one may propagate a malicious object to the other.

In the context of computer security, outbreak pathology includes the study of how malicious objects enter a system and then propagate within the system. In this case, the "system" may be an enterprise network. For example, a malware object enters the system when a computer on the enterprise network becomes infected with a malware object. The malware object may then propagate throughout the enterprise by piggybacking on shared resources, files, emails, and other transfers of data.

An ex post facto outbreak pathology may be useful in analyzing how a malware object entered the enterprise ecosystem, and then propagated through the ecosystem. In one example, this pathology may be reported to a security services provider or to an internal enterprise security controller. The security services provider may receive many pathologies associated with many outbreaks, and may thus build profiles to identify weak security postures and security apertures. Such ex post facto analysis is not always a primary tool in stopping a current malware outbreak, but may prove invaluable in identifying, characterizing, and blocking future malware attacks.

To proactively prevent malware outbreaks, an enterprise security controller may analyze telemetry data that it receives from client devices on its network, and may infer a pathology that a future outbreak may follow, as informed by ex post facto analysis of prior outbreaks. In some cases, the enterprise security controller may even simulate the inferred outbreak in a sandbox environment to estimate the paths that a future outbreak may take. Once weak points in a network are identified, the security of those points may be improved.

However, if the outbreak pathology analysis accounts only for intra-enterprise telemetry data and enterprise connections, some important malware vectors may be overlooked.

For example, an enterprise client device may be operated by a human user. Just as the client device communicatively couples to other enterprise machines via shared resources and shared data, the human user may be said to be socially coupled to a network of other humans by virtue of shared interests, activities, responsibilities, or beliefs. While these human networks do not necessarily operate within the same enterprise, the near universal penetration of computing devices in the developed world means that most of these human actors will operate at least one computing device. Just as machines on an enterprise network may share resources via formally structured network services, human users may share resources and data via less formal connections. To provide just one example, an enterprise network client may receive an email from a user outside of the network, because people like to forward jokes, pictures, and videos they find amusing, informative, or uplifting. If the email includes a malicious payload, and if the enterprise antivirus services have not yet properly characterized that payload, then the malware object may enter into the enterprise computing network. The malware object may then spread across the enterprise, and may cause substantial harm before it can be intercepted and remedied.

This result may be ameliorated, however, if in addition to enterprise telemetry graphing, the enterprise security controller also engages in out-of-band connection graphing, including graphing of social connections.

In certain examples, the enterprise security controller may create a social graph of a user's social connections. Social connections may be any of the types of connections disclosed herein, including by way of nonlimiting example, social networking websites or applications, professional associations, personal associations, club memberships, religious congregation affiliations, and other similar social connections. Just as a client device may be at risk from a machine that appears on the client device's telemetry graph, a machine operated by a user may be at risk when one of the user's social connections has been compromised. Thus, each social connection may provide a vector for a malware object to attack the enterprise.

Social connections may also be particularly relevant to social engineering types of attacks. A social engineering attack may be less automated and more targeted then a traditional malware attack. In a social engineering attack, a user may be misled into believing that he is disclosing information to a party that is legitimately entitled to the information. A successful social engineering attack may spread across a social network similar to how a malware object propagates itself across a telemetry network. Social engineering attacks may be used in conjunction with malware code as well. For example, a social engineering attack may be used as a gateway to install a malware object on an enterprise computing device, so that the malware object can then propagate throughout the network via privileged connections. Thus, a user who has connections to a victim of a social engineering attack may place not only his own device, but the entire network at risk if a hacker is able to successfully socially engineer his way into the user's confidence.

Another danger of social engineering attacks is that information gained in a first social engineering exploit may be used to lend credibility to a downstream attack. For example, if an attacker successfully compromises personally-identifying information about a user, he may selectively insert such information into a targeted e-mail to a social connection to credibly appear to be the first user.

Once the telemetry graph and social graph are constructed, useful correlations may also be drawn. For example, a client that has a network connection to a compromised device, and that is operated by a user who has a social connection to a compromised user, may be of particular interest, and may represent a synergy between a malware object and a social attack. The user and his machine that are at the center of this confluence of factors have an increased risk of infection. As noted above, if the user's machine can be infected, it may be able to propagate even further along the network. Such a confluence may be referred to as a "bridge point." As used throughout this specification, a bridge point is a network endpoint represented by a device or a user that has connections to two or more malicious object vectors. In one example, bridge points may be identified as points of particular risk to a protected enterprise.

A system and method of execution profiling detection will now be described with more particular reference to the appended FIGURES. Throughout the FIGURES, common numerals are used to specify common elements across multiple FIGURES. However, this is not intended to imply a necessary or strict relationship between different embodiments disclosed herein. In some cases, one or more different examples or species of the same elements may be referred to in a hyphenated form. Thus, for example, the numerals 1xx-1 and 1xx-2 may refer to two different species or examples of a class of objects referred to as 1xx.

Figure 1:
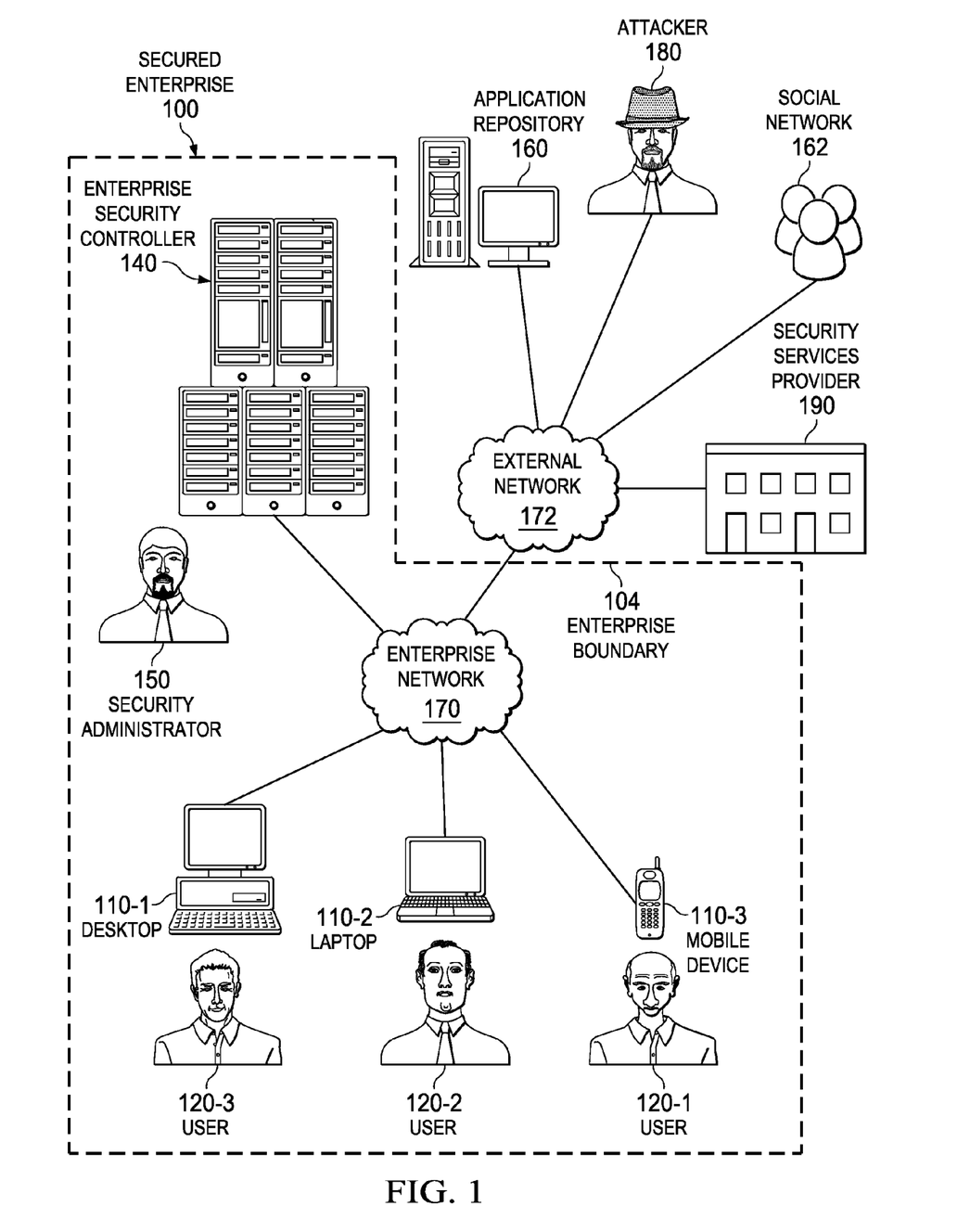
FIG. 1 is a block diagram of a security-enabled network according to one or more examples of the present Specification.

FIG. 1 is a network-level diagram of a secured enterprise 100 according to one or more examples of the present Specification. In the example of FIG. 1, a plurality of users 120 operate a plurality of client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

One or more computing devices configured as an enterprise security controller (ESC) 140 may also operate on enterprise network 170. ESC 140 may provide a user interface for an awesome security administrator 150 to define enterprise security policies, which ESC 140 may enforce on enterprise network 170 and across client devices 120.

Secured enterprise 100 may encounter a variety of "security objects" on the network. A security object may be any object that operates on or interacts with enterprise network 170 and that has actual or potential security implications. In one example, object may be broadly divided into hardware objects, including any physical device that communicates with or operates via the network, and software objects.

Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Enterprise security policies may include authentication policies, network usage policies, network resource quotas, antivirus policies, and restrictions on executable objects on client devices 110 by way of non-limiting example. Various network servers may provide substantive services such as routing, networking, enterprise data services, and enterprise applications.

Secure enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172.

It may be a goal of users 120 and secure enterprise 100 to successfully operate client devices 110 without interference from attacker 180 or from unwanted security objects. In one example, attacker 180 is a malware author whose goal or purpose is to cause malicious harm or mischief. The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this Specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device 200. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new Application repository 160 may represent a Windows or Apple "app store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 120.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Collectively, any object that is or can be designated as belonging to any of the foregoing classes of undesirable objects may be classified as a malicious object. When an unknown object is encountered within secured enterprise 100, it may be initially classified as a "candidate malicious object." This designation may be to ensure that it is not granted full network privileges until the object is further analyzed. Thus, it is a goal of users 120 and security administrator 150 to configure and operate client devices 110 and enterprise network 170 so as to exclude all malicious objects, and to promptly and accurately classify candidate malicious objects.

One or more users 120 may also connect via enterprise network 170 and/or external network 172 to a social network 162. In this context, social network 162 should be broadly construed to include any social affiliation. This may include, by way of nonlimiting example, social networking websites or applications, professional associations, personal associations, club memberships, religious congregation affiliations, and other similar social connections.

Figure 1A:
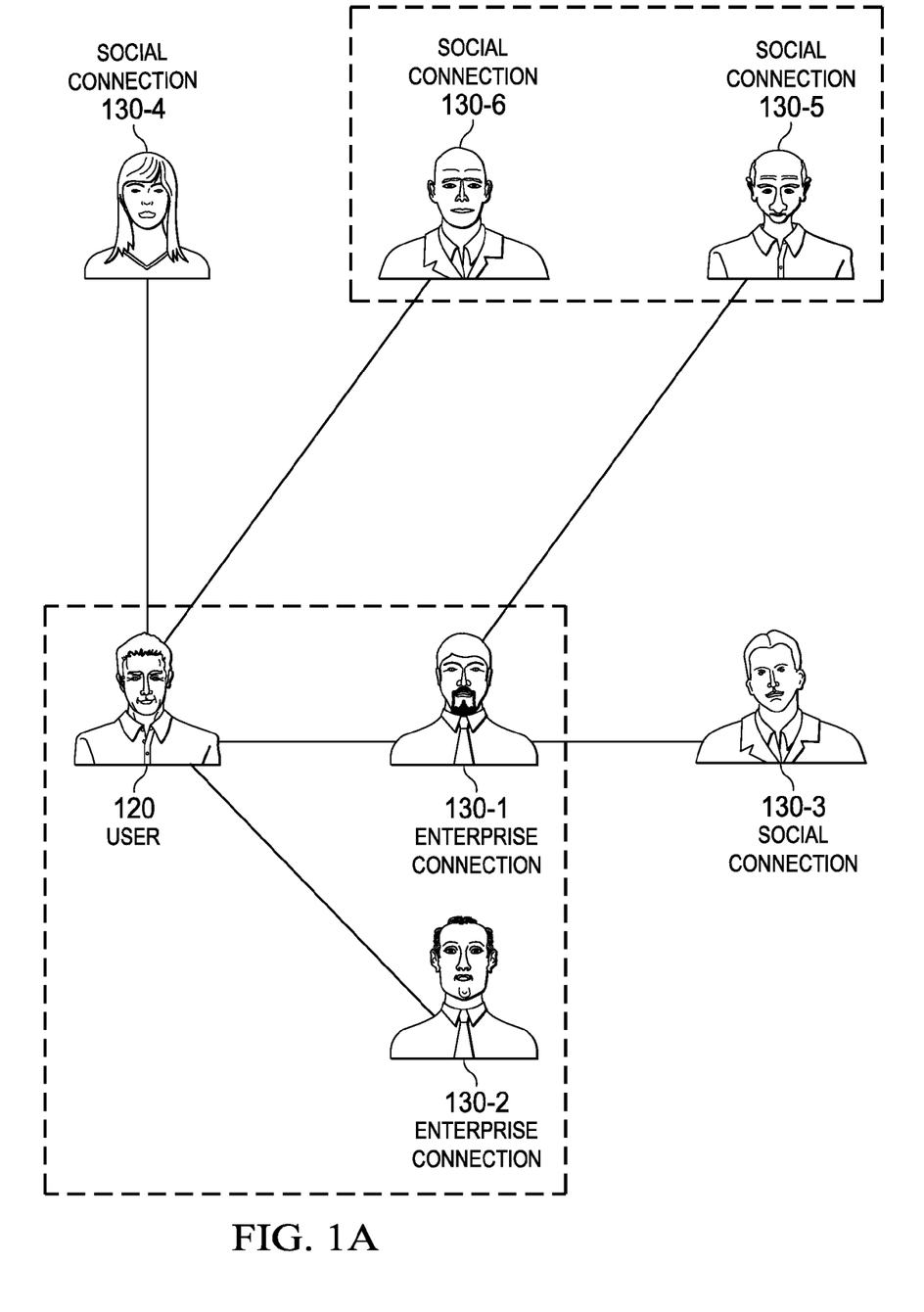
FIG. 1A is a block diagram of additional connections, including social connections, according to one or more examples of the present Specification.

In FIG. 1A, it can be seen that a user 120 may have a number of connections 130. In this example, user 120 is connected within enterprise 100 to enterprise connections 130-1 and 130-2. In this case, user 120 may also have a direct network connection to enterprise connection 130-1 and enterprise connection 130-2.

User 120 is also connected to social connection 130-6, who operates within social network 162. Finally, user 120 is connected to social connection 130-4, which may be a less formal connection, such as a personal acquaintance.

User 120 is also indirectly connected to a plurality of other users. For example, enterprise connection 130-1 is individually connected to social connection 130-3, and to social connection 130-5 via social network 162. Thus, social connection 130-5 and social connection 130-3 may be termed second-order connections to user 120. Second-order connections, or in general nth-order connections, may be considered in a social graph, and may be weighted differently from first-order connections. In one example, the degree of severity decreases inversely with the degree of separation. Thus, the more a user 120 is separated from a connection 130, the less likely that an infection of connection 130 will make its way to a computer operated by user 120.

Figure 2:
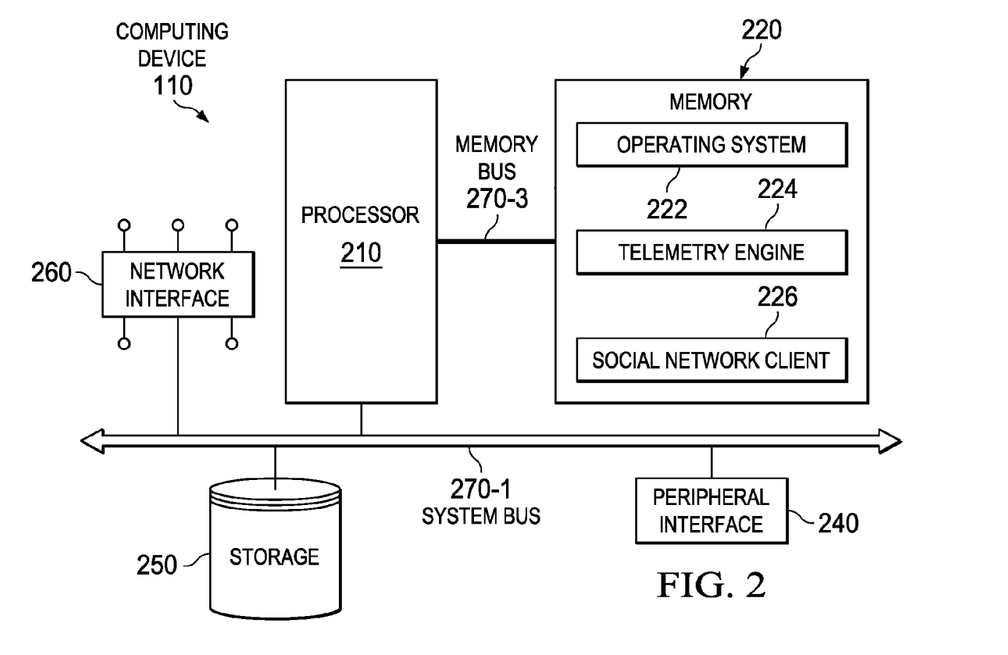
FIG. 2 is a block diagram of a computing device according to one or more examples of the present Specification.

FIG. 2 is a block diagram of computing device 200 according to one or more examples of the present Specification. Computing device 200 may be any suitable computing device. In various embodiments, a "computing device" may be or comprise, by way of non-limiting example, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data.

In certain embodiments, client devices 110 may all be examples of computing devices 200.

Computing device 200 includes a processor 210 connected to a memory 220, having stored therein executable instructions for providing an operating system 222 and at least software portions of a telemetry client 224. Other components of computing device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of telemetry client 224. Many other configurations are also possible, and are intended to be encompassed within the broad scope of this Specification.

Network interface 260 may be provided to communicatively couple computing device 200 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Telemetry client 224, in one example, is operable to carry out computer-implemented methods as described in this Specification. Telemetry client 224 may include one or more non-transitory computer-readable mediums having stored thereon executable instructions operable to instruct a processor to provide a telemetry client 224. As used throughout this Specification, an "engine" includes any combination of one or more logic elements, of similar or dissimilar species, operable for and configured to perform one or more methods provided by the engine. Thus, telemetry client 224 may comprise one or more logic elements configured to provide methods as disclosed in this Specification. In some cases, telemetry client 224 may include a special integrated circuit designed to carry out a method or a part thereof, and may also include software instructions operable to instruct a processor to perform the method. In some cases, telemetry client 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that telemetry client 224 may also include other hardware and software, including configuration files, registry entries, and interactive or user-mode software by way of non-limiting example.

In one example, telemetry client 224 includes executable instructions stored on a non-transitory medium operable to perform a method according to this Specification. At an appropriate time, such as upon booting computing device 200 or upon a command from operating system 222 or a user 120, processor 210 may retrieve a copy of telemetry client 224 (or software portions thereof) from storage 250 and load it into memory 220. Processor 210 may then iteratively execute the instructions of telemetry client 224 to provide the desired method.

Memory 220 may also include a social network client 226 that communicatively couples computing device 110 to a social network 162.

Peripheral interface 240 may be configured to interface with any auxiliary device that connects to computing device 200 but that is not necessarily a part of the core architecture of computing device 200. A peripheral may be operable to provide extended functionality to computing device 200, and may or may not be wholly dependent on computing device 200. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 3:
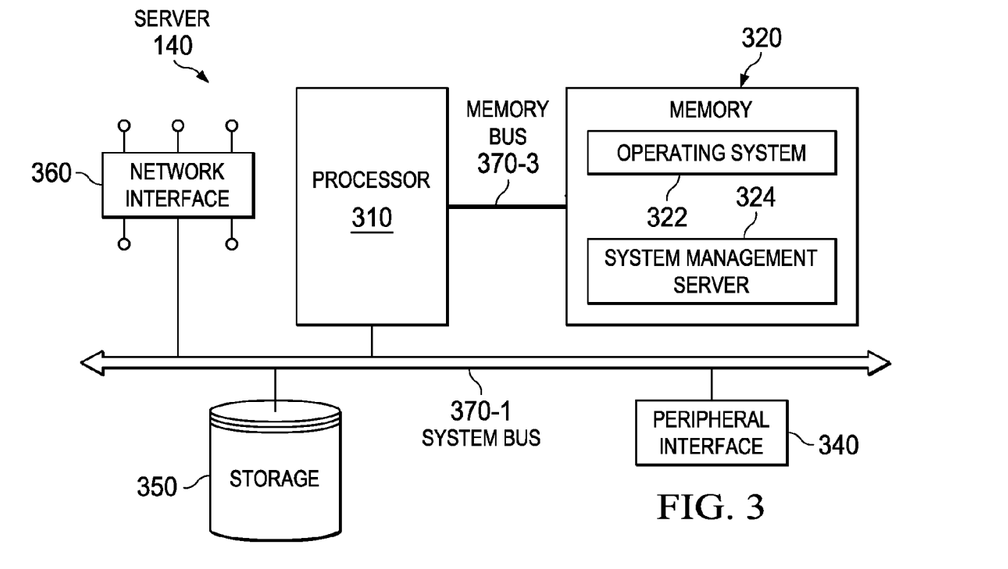
FIG. 3 is a block diagram of a server according to one or more examples of the present Specification.

FIG. 3 is a block diagram of server-class computer 300 according to one or more examples of the present Specification. Server-class computer 300 may be any suitable computing device, as described in connection with FIG. 2. Examples of server-class computer 300 include enterprise security controller 140, and servers operated by security services provider 190. In general, the definitions and examples of FIG. 2 may be considered as equally applicable to FIG. 3, unless specifically stated otherwise. Server-class computer 300 is described herein separately to illustrate that in certain embodiments, logical operations according to this Specification may be divided along a client-server model, wherein computing device 200 provides certain localized tasks, while server-class computer 300 provides certain other centralized tasks.

Server-class computer 300 includes a processor 310 connected to a memory 320, having stored therein executable instructions for providing an operating system 322 and at least software portions of a server engine 324. Other components of server-class computer 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server-class computer 300 to a wired or wireless network, and may include one or more logic elements as described in FIG. 2.

Server engine 324 is an engine as described in FIG. 2 and, in one example, includes one or more logic elements operable to carry out computer-implemented methods as described in this Specification. Software portions of server engine 324 may run as a daemon process.

Server engine 324 may include one or more non-transitory computer-readable mediums having stored thereon executable instructions operable to instruct a processor to provide a security engine. At an appropriate time, such as upon booting server-class computer 300 or upon a command from operating system 222 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method.

Peripheral interface 340 may be configured to interface with any auxiliary device that connects to server-class computer 300 but that is not necessarily a part of the core architecture of server-class computer 300. A peripheral may be operable to provide extended functionality to server-class computer 300, and may or may not be wholly dependent on server-class computer 300. Peripherals may include, by way of non-limiting examples, any of the peripherals disclosed in FIG. 2.

Figure 4:
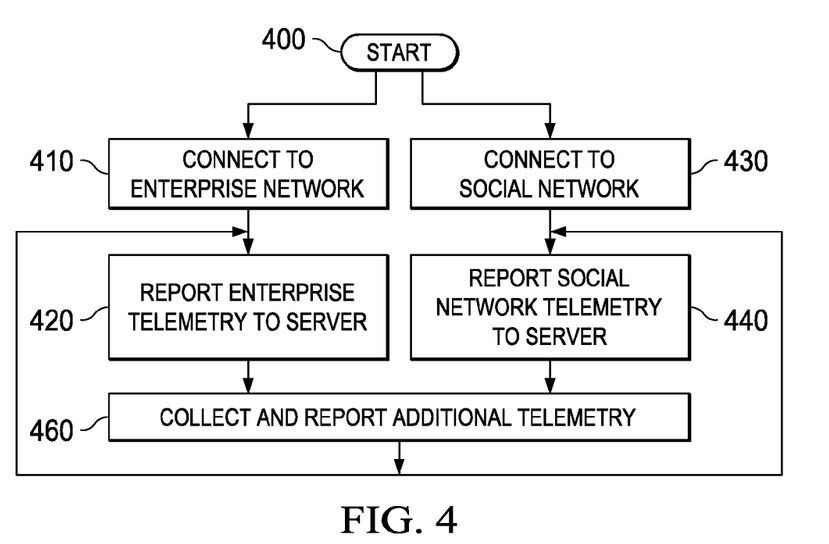
FIG. 4 is a block diagram of a method of collecting and reporting telemetry according to one or more examples of the present Specification.

FIG. 4 is a block diagram of a method 400 according to one or more examples of the present specification. In one embodiment, method 400 is performed by telemetry engine 224 (including in appropriate circumstances, a system management agent).

Method 400 includes two parallel paths. In the first path, in block 410, client device 110 connects to an enterprise network, such as enterprise network 170 of FIG. 1.

In block 420, telemetry engine 224 may report enterprise telemetry to a server such as enterprise security controller 140.

In the parallel path, in block 430, client device 110 connects to a social network such as social network 162 of FIG. 1. It should be understood in this context, and as used throughout this specification and the appended claims, that connecting to a social network involves any interaction with any species of social network. For example, connecting to social network 162 may comprise logging into a service provided by an online social network, sending or receiving an email, sending or receiving a data file, or in any other way communicatively coupling to a different client device 110 or connection 130.

In block 440, telemetry engine 224 may collect appropriate telemetry regarding the social connection. Note that in certain cases, to comply with applicable laws and regulations, this may be done with the consent of a user 120. To differentiate between data collected in block 420, these data may be termed "social telemetry."

In block 460, telemetry client 224 may collect and report any additional telemetry that available.

The method of FIG. 4 then becomes a loop, in which client device 110 continues reporting appropriate telemetry and social telemetry as long as those data are available.

Figure 5:
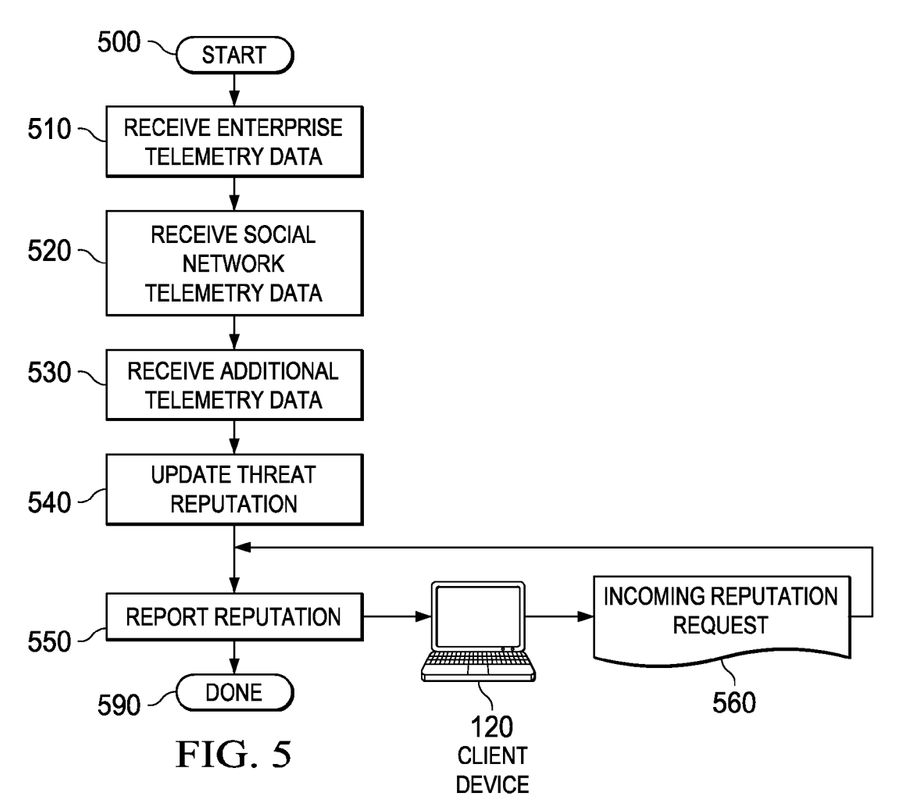
FIG. 5 is a block diagram of updating a reputation database according to telemetry according to one or more examples of the present Specification.

FIG. 5 is a flow diagram of a method according to one or more examples of the present Specification. In one embodiment, the method of FIG. 5 is performed by server-class computer 300, such as enterprise security controller 140, or a device operated by security services provider 190. In other embodiments, at least some functions of method 500 may be performed on client device 110.

In block 510, system management server 324 receives enterprise telemetry data from a client device 110. This may include a network data packet, or may be an internal report within one of telemetry engine 224 or system management server 324.

In block 520, system management server 324 receives social network telemetry data from client device 110.

In block 530, system management server 324 receives any additional telemetry data from computing device 110.

In block 540, based on the inputs received from client device 110, system management server 324 may update its databases, and or its threat matrix.

In block 540, system management server engine 324 computes and/or updates a threat reputation for client device 110, and any software that was found on client device 110. The threat reputation may comprise calculating a new numerical reputation score for the object based on inputs received.

In block 550, client device 120 provides incoming reputation request 560 to system management server 324. This may be a request to provide a reputation for an object newly-encountered by client device 110.

In block 550, system management server 324 reports the correct reputation to client device 120.

In block 590, the method is done. It should be noted, however, that this method may be performed in some embodiments in a continuous loop, updating a threat intelligence database. For example, enterprise security controller 140 may be a suitable device such as a McAfee®, Inc. ePolicyOrchestrator (ePO) compliance, while security services provider 190 may provide a service such as the McAfee® Global Threat Intelligence (GTI) service. GTI and ePO are examples of products for security event outbreak containment and control that rely on telemetry data obtained from a large population of devices or nodes to provide early warning. These already-capable tools can be enhanced with social telemetry data. For example, existing examples of these products may rely on device telemetry data that may capture previous device-to-device interaction telemetry as a way to predict possible future malware propagation paths. Social networks instead identify person-person interactions that may be device independent. Typical miscreant behavior may result in individuals changing devices frequently to obfuscate their telemetry footprint. Thus, inclusion of social telemetry provides advantages over device telemetry alone.

Figure 6:
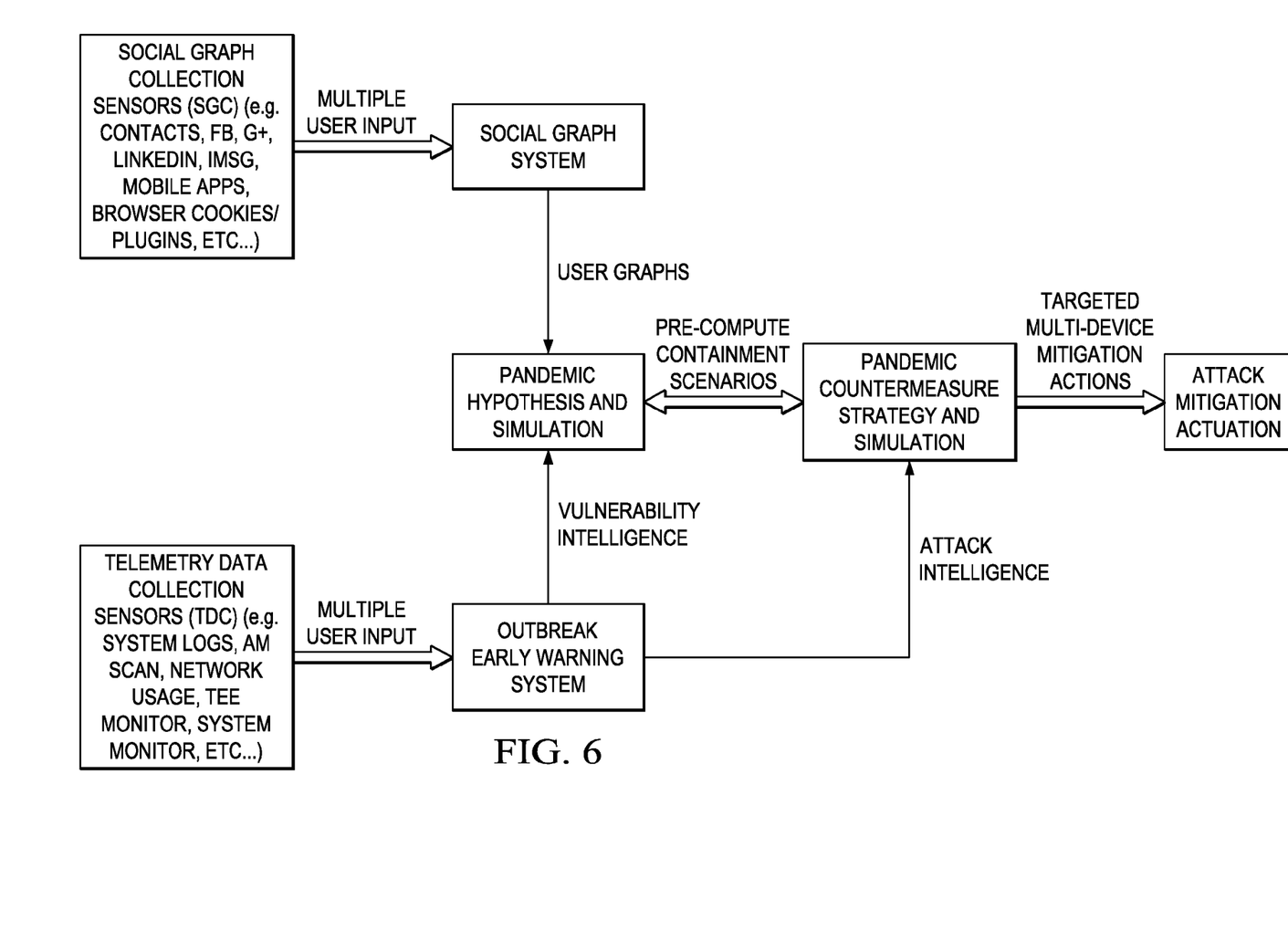
FIG. 6 is a functional block diagram of a method of outbreak pathology inference according to one or more examples of the present Specification.

FIG. 6 is a functional block diagram of selected functions of a system management server 324 according to one or more examples of the present specification.

In the example of FIG. 6, system management server 324 performs a social graph collection. This may include, by way of nonlimiting example, collecting data about contacts, Facebook friends and interests, Google+, LinkedIn, instant messengers, mobile apps, browser cookies, plug-ins, and other similar data that pertain to a user's connection with other users, in addition to the categories of connections described in this Specification. Multiple user inputs are then provided to a social graph system.

The social graph system creates a graph of a user's social connections, and provides user graphs to a pandemic hypothesis and simulation function.

In parallel, system management server 324 also provides telemetry data collection. Telemetry data collection may include any data that may be collected by software or firmware on a client device 110. For example, this may include system logs, anti-malware scans, network usage, a trusted execution environment (TEE) monitor, a system monitor, or any other similar monitoring function that can be provided. These multiple inputs are provided to an outbreak early warning system, which detects not only actual pathology of an outbreak, but also may be provided with logic to infer a potential outbreak scenario and pathology.

System management server 324 uses user graphs and vulnerability intelligence to create a pandemic hypothesis and simulation. In the hypothesis stage, user management agent 324 postulates on a potential path for the outbreak, and may simulate that outbreak pathology, for example in a separate machine, or in a sandboxed or otherwise virtualized or protected environment.

Based on the hypothesis and simulation, system management server 324 may pre-compute containment scenarios and form a pandemic countermeasure strategy. System management server 324 may also optionally simulate the pandemic countermeasure strategy. Attack intelligence from the outbreak early warning system may also provide useful inputs for the countermeasure strategy and simulation.

Based on the mitigation strategy, system management server 324 may provide targeted multi-device mitigation actions to protect at-risk devices. This may include, for example, quarantining a device on the network, connecting the device to a provisioning server that can reimage the machine, updating virus definitions, or otherwise protecting a device, and furthermore protecting the network from the device.

Figure 7:
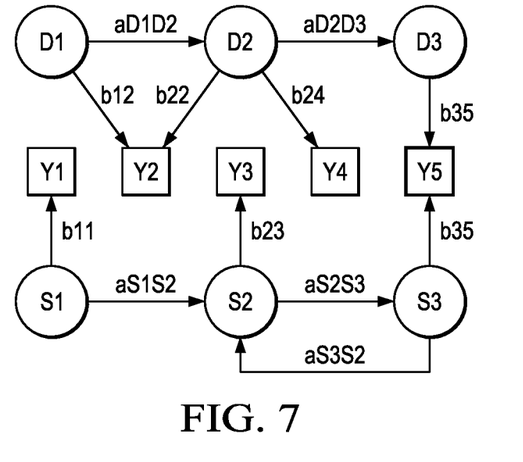
FIG. 7 is a state machine for using a Hidden Markov process for outbreak pathology inference according to one or more examples of the present Specification.

FIG. 7 is an example of a Hidden Markov Process showing relationships of a device telemetry state machine to an observable pathology and a social graph state machine to an observable pathology.

Figure 8:
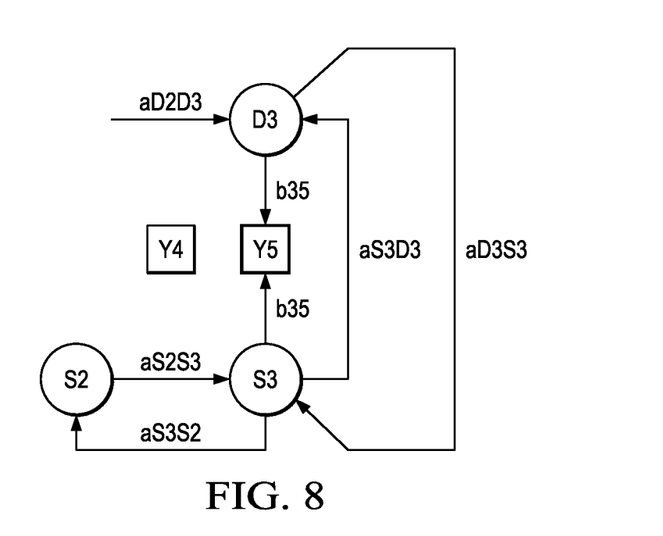
FIG. 8 is an additional state machine illustrating dynamic expansion according to one or more examples of the present Specification.

When the respective graphs resolve to the same observable pathology (such as at Y5), the model regards the observation as a "bridge state." The model may be modified to expand the state transition ranges to include the other graph's state respectively, as illustrated in FIG. 8.

This provides advantages over existing outbreak prediction methods, which depend on historical pathology data to anticipate likely future pathology, under the assumption that future pathology will follow historical pathology. However, as described herein, pathology may also follow social connection pathology because people who have frequent social interactions are most likely to establish electronic connectivity. Thus, the two pathology graphs of FIG. 7 (one social, the other device telemetry), provide enhanced insight into outbreak pathologies as compared to existing systems.

Provided with these graphs, system management server 324 evaluates the graphs to find bridge states where the two graphs have high probabilities of overlap. Bridge states exist when a predictive model of outbreak following both social graph and device telemetry graph arrives at the same node. With bridge states there is a greater likelihood of malware contamination across these nodes.

Multiple outbreak scenarios can be simulated given assumptions made about the type of malware used and the known vulnerabilities given device telemetry data. These scenarios may be used to intelligently respond to outbreak by prioritizing mitigation responses to the people and devices most likely to be targeted by the malware.

As illustrated in FIG. 7, scenario analysis may use Markov models to predict likely pathologies. In the example of FIG. 7, blocks Y1, Y2, Y3, Y4, and Y5 represents observed outbreak events on a network.

In this example, observation Y1 is connected to user S1.

Observation Y2 has connections to devices D1 and D2. Thus, there is a relationship between D1 and Y2, between D2 and Y2, and also between D1 and D2, as these may reside on the same enterprise network.

Observation Y3 has a connection to user S2. User S2 has connections to users S1 and S3. It should also be noted that the social connection between users S2 and S3 is a two-way connection. This may represent, for example, that user S2 follows user S3 on Twitter, and that user S3 also follows user S2 on twitter. It could also mean, for example, that user S2 follows user S3 on twitter, while user S3 follows user S2 on Google+.

Observation Y4 has a connection to machine D2, but no other direct connections. As described above, machines D1 and D3 also have connections to machine D2.

Observations Y5 has connections to device D3 and user S3. This represents a bridge point, in which observation Y5 has both a social and a direct connection to enterprise network 100. In this case, it is possible that user S3 operates machine D3. Because object Y5 is a bridge point, it may be treated with increased severity, and more particular attention may be paid to it and its potential propagation across the network.

FIG. 8 is a block diagram that illustrates dynamic expansion to include the opposite graph's state when an observable pathology is common to both graphs, as in the case of observation Y5. In the example of FIG. 8, it is noted that user S3 may have a connection to machine D3. Machine D3 may also have a connection back to user S3.

Consequently, a pathology scenario that originates from the device telemetry graph may explore states defined by the social graph and vice versa. The model rationalizes this because Y5 represents an exploit or vulnerability that exposes device/social telemetry data that instructs malware to follow the state transitions (e.g. aS3S2 from aD3S3).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in an example, a computing apparatus comprising: a network interface; and one or more logic elements comprising an outbreak pathology inference engine, operable for: receiving network telemetry data from a client device via the network interface; receiving out-of-network telemetry data from the client device via the network interface; and inferring, based at least in part on the network telemetry data and out-of-network data, a malware outbreak hypothesis.

There is further disclosed an example, wherein the out-of-network data comprise social networking data.

There is further disclosed an example, wherein the social network data comprise data selected from the group consisting of online social networking data, professional association data, e-mail sender data, e-mail recipient data, address book data, contacts data, social association data, religious congregation data, There is further disclosed an example, wherein the pathology inference engine is further operable for constructing an out-of-network graph at least partly from the out-of-network data.

There is further disclosed an example, wherein inferring the malware outbreak hypothesis comprises constructing a Markov model of the out-of-network graph and a network graph.

There is further disclosed an example, wherein inferring the malware outbreak hypothesis further comprises identifying a bridge state between the out-of-network graph and the network graph.

There is further disclosed an example, wherein inferring the malware outbreak hypothesis further comprises dynamically redefining the out-of-network graph and network graph to enable evaluation across the graphs at the bridge state.

There is further disclosed an example, wherein inferring the malware outbreak hypothesis comprises constructing a dynamic state model to identify a plurality of outbreak scenarios.

There is further disclosed an example, wherein the pathology inference engine is further operable for constructing an outbreak scenario, and constructing a containment strategy to target specific endpoints for mitigation.

There is further disclosed an example, wherein the pathology inference engine is further operable for: constructing telemetry graph at least partly from the telemetry data; constructing an out-of-network graph at least partly from the out-of-network data; and formulating a pandemic hypothesis based at least in part on the telemetry graph and the out-of-network graph.

There is further disclosed an example, wherein the pathology inference engine is further operable for simulating the pandemic hypothesis.

There is further disclosed an example, wherein the pathology inference engine is further operable for formulating a pandemic countermeasure.

There is further disclosed an example, wherein the pathology inference engine is further operable for simulating the pandemic countermeasure.

There is further disclosed in an example, one or more computer-readable mediums having stored thereon executable instructions operable for instructing a processor to provide a pathology inference engine operable for: receiving network telemetry data from a client device; receiving out-of-network telemetry data from the client device; and inferring, based at least in part on the network telemetry data and out-of-network data, a malware outbreak hypothesis.

There is further disclosed an example, wherein the out-of-network data comprise social networking data.

There is further disclosed an example, wherein the social network data comprise data selected from the group consisting of online social networking data, professional association data, e-mail sender data, e-mail recipient data, address book data, contacts data, social association data, religious congregation data, There is further disclosed an example, wherein the pathology inference engine is further operable for constructing an out-of-network graph at least partly from the out-of-network data.

There is further disclosed an example, wherein inferring the malware outbreak hypothesis comprises constructing a Markov model of the out-of-network graph and a network graph.

There is further disclosed an example, wherein inferring the malware outbreak hypothesis further comprises identifying a bridge state between the out-of-network graph and the network graph.

There is further disclosed an example, wherein inferring the malware outbreak hypothesis further comprises dynamically redefining the out-of-network graph and network graph to enable evaluation across the graphs at the bridge state.

There is further disclosed an example, wherein inferring the malware outbreak hypothesis comprises constructing a dynamic state model to identify a plurality of outbreak scenarios.

There is further disclosed an example, wherein the pathology inference engine is further operable for constructing an outbreak scenario, and constructing a containment strategy to target specific endpoints for mitigation.

There is further disclosed an example, wherein the pathology inference engine is further operable for: constructing telemetry graph at least partly from the telemetry data; constructing an out-of-network graph at least partly from the out-of-network data; and formulating a pandemic hypothesis based at least in part on the telemetry graph and the out-of-network graph.

There is further disclosed in an example, a computer-implemented method of providing pathology inference, comprising: receiving network telemetry data from a client device; receiving out-of-network telemetry data from the client device; and inferring, based at least in part on the network telemetry data and out-of-network data, a malware outbreak hypothesis.

There is further disclosed an example, further comprising: constructing an out-of-network graph at least partly from the out-of-network data; constructing a network graph at least partly from the network data; and constructing a Markov model of the out-of-network graph and a network graph.

What is claimed is:

1. A computing apparatus comprising:
   a network interface; and
   one or more logic elements, including at least a processor and a memory, comprising an outbreak pathology inference engine, operable for:
   receiving network telemetry data from a client device via the network interface;
   receiving out-of-network telemetry data from the client device via the network interface; and
   inferring, based at least in part on the network telemetry data and out-of-network data, a predictive malware outbreak hypothesis.

2. The computing apparatus of claim 1, wherein the out-of-network data comprise social networking data.

3. The computing apparatus of claim 2, wherein the social network data comprise data selected from the group consisting of online social networking data, professional association data, e-mail sender data, e-mail recipient data, address book data, contacts data, social association data, religious congregation data.

4. The computing apparatus of claim 1, wherein the pathology inference engine is further operable for constructing an out-of-network graph at least partly from the out-of-network data.

5. The computing apparatus of claim 4, wherein inferring the malware outbreak hypothesis comprises constructing a Markov model of the out-of-network graph and a network graph.

6. The computing apparatus of claim 5, wherein inferring the malware outbreak hypothesis further comprises identifying a bridge state between the out-of-network graph and the network graph.

7. The computing apparatus of claim 6, wherein inferring the malware outbreak hypothesis further comprises dynamically redefining the out-of-network graph and network graph to enable evaluation across the graphs at the bridge state.

8. The computing apparatus of claim 1, wherein inferring the malware outbreak hypothesis comprises constructing a dynamic state model to identify a plurality of outbreak scenarios.

9. The computing apparatus of claim 1, wherein the pathology inference engine is further operable for constructing an outbreak scenario, and constructing a containment strategy to target specific endpoints for mitigation.

10. The computing apparatus of claim 1, wherein the pathology inference engine is further operable for:
    constructing telemetry graph at least partly from the telemetry data;
    constructing an out-of-network graph at least partly from the out-of-network data; and
    formulating a pandemic hypothesis based at least in part on the telemetry graph and the out-of-network graph.

11. The computing apparatus of claim 10, wherein the pathology inference engine is further operable for simulating the pandemic hypothesis.

12. The computing apparatus of claim 10, wherein the pathology inference engine is further operable for formulating a pandemic countermeasure.

13. The computing apparatus of claim 12, wherein the pathology inference engine is further operable for simulating the pandemic countermeasure.

14. One or more tangible, non-transitory computer-readable mediums having stored thereon executable instructions operable for instructing a processor to provide a pathology inference engine operable for:
    receiving network telemetry data from a client device;
    receiving out-of-network telemetry data from the client device; and
    inferring, based at least in part on the network telemetry data and out-of-network data, a predictive malware outbreak hypothesis.

15. The one or more computer-readable mediums of claim 14, wherein the out-of-network data comprise social networking data.

16. The one or more computer-readable mediums of claim 15, wherein the social network data comprise data selected from the group consisting of online social networking data, professional association data, e-mail sender data, e-mail recipient data, address book data, contacts data, social association data, religious congregation data.

17. The one or more computer-readable mediums of claim 14, wherein the pathology inference engine is further operable for constructing an out-of-network graph at least partly from the out-of-network data.

18. The one or more computer-readable mediums of claim 17, wherein inferring the malware outbreak hypothesis comprises constructing a Markov model of the out-of-network graph and a network graph.

19. The one or more computer-readable mediums of claim 18, wherein inferring the malware outbreak hypothesis further comprises identifying a bridge state between the out-of-network graph and the network graph.

20. The one or more computer-readable mediums of claim 19, wherein inferring the malware outbreak hypothesis further comprises dynamically redefining the out-of-network graph and network graph to enable evaluation across the graphs at the bridge state.

21. The one or more computer-readable mediums of claim 14, wherein inferring the malware outbreak hypothesis comprises constructing a dynamic state model to identify a plurality of outbreak scenarios.

22. The one or more computer-readable mediums of claim 14, wherein the pathology inference engine is further operable for constructing an outbreak scenario, and constructing a containment strategy to target specific endpoints for mitigation.

23. The one or more computer-readable mediums of claim 14, wherein the pathology inference engine is further operable for:
   constructing telemetry graph at least partly from the telemetry data;
   constructing an out-of-network graph at least partly from the out-of-network data; and
   formulating a pandemic hypothesis based at least in part on the telemetry graph and the out-of-network graph.

24. A computer-implemented method of providing pathology inference, comprising:
   receiving network telemetry data from a client device;
   receiving out-of-network telemetry data from the client device; and
   inferring, based at least in part on the network telemetry data and out-of-network data, a predictive malware outbreak hypothesis.

25. The method of claim 24, further comprising: constructing an out-of-network graph at least partly from the out-of-network telemetry data;
   constructing a network graph at least partly from the network telemetry data; and
   constructing a Markov model of the out-of-network graph and the network graph.

* * * * *